(12) United States Patent
Sager

(10) Patent No.: US 8,969,717 B2
(45) Date of Patent: Mar. 3, 2015

(54) THERMOELECTRIC STACK COATING FOR IMPROVED SOLAR PANEL FUNCTION

(75) Inventor: Brian M. Sager, Menlo Park, CA (US)

(73) Assignee: aeris CAPITAL Sustainable IP Ltd., Grand Cayman (KY)

( * ) Notice: Subject to any disclaimer, the term of this patent is extended or adjusted under 35 U.S.C. 154(b) by 106 days.

(21) Appl. No.: 13/209,360

(22) Filed: Aug. 12, 2011

(65) Prior Publication Data

US 2012/0132256 A1      May 31, 2012

Related U.S. Application Data

(60) Provisional application No. 61/373,262, filed on Aug. 12, 2010, provisional application No. 61/373,265, filed on Aug. 12, 2010, provisional application No. 61/375,230, filed on Aug. 19, 2010, provisional application No. 61/375,793, filed on Aug. 20, 2010, provisional application No. 61/405,043, filed on Oct. 20, 2010.

(51) Int. Cl.
| | |
|---|---|
| *H01L 31/00* | (2006.01) |
| *H02N 10/00* | (2006.01) |
| *H02S 10/10* | (2014.01) |
| *H02N 1/04* | (2006.01) |

(52) U.S. Cl.
CPC ............ *H01L 31/0583* (2013.01); *H02N 10/00* (2013.01); *Y02E 10/50* (2013.01)
USPC .......................................... 136/259; 310/306

(58) Field of Classification Search
None
See application file for complete search history.

(56) References Cited

U.S. PATENT DOCUMENTS

| | | | | |
|---|---|---|---|---|
| 2,820,841 | A * | 1/1958 | Carlson et al. ................ | 136/258 |
| 3,956,017 | A * | 5/1976 | Shigemasa ..................... | 136/206 |
| 4,235,221 | A * | 11/1980 | Murphy ........................ | 126/567 |
| 2002/0153882 | A1 * | 10/2002 | Grimes et al. ................ | 324/209 |
| 2007/0290287 | A1 * | 12/2007 | Freedman ..................... | 257/443 |
| 2008/0053514 | A1 * | 3/2008 | Micallef ........................ | 136/248 |
| 2008/0295878 | A1 * | 12/2008 | Dai et al. ....................... | 136/201 |
| 2009/0217962 | A1 * | 9/2009 | Liggett .......................... | 136/206 |
| 2009/0315335 | A1 * | 12/2009 | Ujihara et al. ................ | 290/1 R |

OTHER PUBLICATIONS

CRC Handbook of Chemistry and Physics, 94th Ed., Internet Version 2014, W. M. Haynes, ed. [retrieved from internet at http://www.hbcpnetbase.com on Apr. 1, 2014].*

L. Carlioz, et al., "Temperature threshold tuning of a thermal harvesting switch", Transducers: 2009 International Solid-state Sensors, Actuators, and Microsystems Conference, p. 1385-1388, Jun. 21-25, 2009.*

\* cited by examiner

*Primary Examiner* — Jeffrey T Barton
*Assistant Examiner* — Eric R Smith
(74) *Attorney, Agent, or Firm* — Joshua D. Isenberg; JDI Patent

(57) ABSTRACT

Methods and devices for increase power output from solar devices. In one embodiment, the technique enables the front hot solar panel surface to be cooled by attachment of a thermoelectric multilayer stack to the back solar panel surface. The thermoelectric stack cools the solar panel front surface by drawing heat from the front to the back of the panel. That heat is transformed into mechanical vibrations using an inverse Peltier effect and that mechanical energy then transformed into electrical energy using a piezoelectric effect. Power output is first increased by lower operating temperature on front, resulting in a higher power conversion efficiency for the photovoltaic effect taking place in the CIGS/CdS active layers or other thin films, then from an additional power output from secondary electrical energy created from mechanical arising from the temperature-gradient driven occurrence of the thermoelectric effect.

18 Claims, 11 Drawing Sheets

THERMOELECTRIC STACK COATING FOR IMPROVED SOLAR PANEL FUNCTION

CROSS-REFERENCE TO RELATED APPLICATIONS

This application claims priority to U.S. Provisional Application Ser. Nos. 61/373,262 filed Aug. 12, 2010, 61/373,265 filed Aug. 12, 2010, 61/375,230 filed Aug. 19, 2010, 61/375,793 filed Aug. 20, 2010, and 61/405,043 filed Oct. 20, 2010. All of the foregoing applications are fully incorporated herein by reference for all purposes.

FIELD OF THE INVENTION

This invention relates to methods and devices for increasing electrical power output from devices such as but not limited to solar panels and solar cells.

BACKGROUND OF THE INVENTION

Thermo-electrical devices convert thermal energy into electrical energy, by means of the Seebeck effect, also called the inverse Peltier effect, which was discovered by Seebeck in 1821. Effectively harnessing this potential energy generation technique, however, remains a challenge.

SUMMARY OF THE INVENTION

The disadvantages associated with the prior art are overcome by some or all embodiments of the present invention. With the proper choice of materials, a device manifesting the inverse Peltier effect can create 18 mW/cm$^2$ with a 50K Temp difference (Ujihara et al, 2007). For comparison, a 10% solar panel produces approximately 10 mW/cm2 through the photovoltaic effect.

In one embodiment of the present invention, this enables the front hot solar panel surface to be cooled by attachment of a thermoelectric multilayer stack to the back solar panel surface. The thermoelectric stack cools the solar panel front surface by drawing heat from the front to the back of the panel. That heat is transformed into mechanical vibrations using an inverse Peltier effect and that mechanical energy then transformed into electrical energy using a piezoelectric effect. Power output is first increased by lower operating temperature on front, resulting in a higher power conversion efficiency for the photovoltaic effect taking place in the CIGS/CdS active layers, then from an additional power output from secondary electrical energy created from mechanical arising from the temperature-gradient driven occurrence of the thermoelectric effect. This approach results in two concurrent boosts in power output. It may also extend the life of the solar panel by lowering its average operating temperature, which should increasing its operating lifetime. Although some examples herein describe the use of CIGS/CdS active layers, other active layer such as CdTe, CZTS, silicon, or other materials are not excluded.

In another embodiment of the present invention, a photovoltaic and thermoelectric power generating device is provided comprising: a structure including: at least one photovoltaic cell; a thermally conductive backsheet below the cell; at least one thermoelectric converter thermally coupled to said structure at a high-temperature end thereof to receive at least a portion of generated heat such that a temperature differential is achieved across the at least one thermoelectric converter.

Optionally, the following may also be adapted for use with any of the embodiments disclosed herein. For example, the photovoltaic cell has a substrate comprises a material to absorb spectrum not absorbed by an absorber layer in the photovoltaic cell. Optionally, the photovoltaic cell is formed on solar selective metal absorber with a thermal conductivity of at least 250 k-W/(m·K). Optionally, the photovoltaic cell is formed on solar selective metal absorber with a thermal conductivity of at least 40 k-W/(m·K). Optionally, the solar-electrical generator exhibits a solar energy conversion of at least 4%. Optionally, a temperature difference between the high-temperature and a low-temperature ends of said thermoelectric converter is at least about 50 C. Optionally, the thermally conductive substrate comprises of a metal foil. Optionally, the at least one thermoelectric converter and the photovoltaic cell are thermally and physically integrated. Optionally, the at least one thermoelectric converter and the photovoltaic cell are thermally integrated by physically separated by the back sheet. Optionally, the at least one thermoelectric converter is electrically coupled to feed current to the photovoltaic cell and are electrically integrated. Optionally, the at least one thermoelectric converter is electrically coupled to feed current to separate sources and are not electrically integrated. Optionally, the at least one thermoelectric converter is located at harmonically optimum locations to increase vibration. Optionally, the at least one thermoelectric converter comprises a hard ferromagnet and a soft ferromagnetic material. Optionally, the at least one thermoelectric converter comprises a hard ferromagnet and a soft ferromagnetic material, wherein, an elastic material is sandwiched therebetween to improve rebound effect and facilitate oscillation. Optionally, the device is flat, planar panel. Optionally, the thermoelectric converter comprises a plurality of pairs of P-type and N-type thermoelectric elements wherein the P-type and N-type thermoelectric elements of each pair are electrically coupled in series, and wherein the P-type and N-type thermoelectric elements of each pair are thermally coupled in parallel between first and second thermally conductive plates. Optionally, heat from the solar absorber is received by a hot side of the thermoelectric converter; generating electricity from the thermoelectric converters; and providing heat from a cold side of the set of thermoelectric converters to a fluid being provided into a solar fluid heating system or a solar thermal to electrical conversion plant. Optionally, the photovoltaic cell has an absorber layer that includes one or more inorganic materials from the group consisting of: titania (TiO2), nanocrystalline TiO2, zinc oxide (ZnO), copper oxide (CuO or Cu2O or CuxOy), zirconium oxide, lanthanum oxide, niobium oxide, tin oxide, indium oxide, indium tin oxide (ITO), vanadium oxide, molybdenum oxide, tungsten oxide, strontium oxide, calcium/titanium oxide and other oxides, sodium titanate, potassium niobate, cadmium selenide (CdSe), cadmium sulfide (CdS), copper sulfide (Cu2S), cadmium telluride (CdTe), cadmium-tellurium selenide (CdTeSe), copper-indium selenide (CuInSe2), cadmium oxide (CdOx), CuI, CuSCN, a semiconductive material, or combinations of the above. Optionally, the thermally conductive substrate comprises of at least one material selected from the group consisting of: stainless steel, copper, aluminum, molybdenum, or combinations thereof. Optionally, the thermally conductive substrate comprises of a metallized plastic or polymer.

It should be understood that embodiments of the present invention may include methods regarding how mechanical and electrical energy could be converted in either direction during movement.

A further understanding of the nature and advantages of the invention will become apparent by reference to the remaining portions of the specification and drawings.

DESCRIPTION OF THE SPECIFIC EMBODIMENTS

Figure 1:
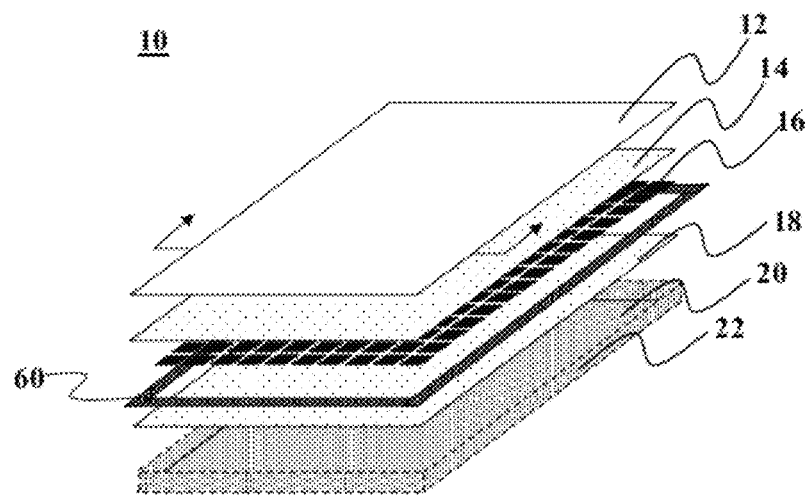
FIG. 1 shows an exploded perspective view of a photovoltaic module with a metal, thermally conductive back layer according to one embodiment of the present invention.

It is to be understood that both the foregoing general description and the following detailed description are exemplary and explanatory only and are not restrictive of the invention, as claimed. It may be noted that, as used in the specification and the appended claims, the singular forms "a", "an" and "the" include plural referents unless the context clearly dictates otherwise. Thus, for example, reference to "a material" may include mixtures of materials, reference to "a compound" may include multiple compounds, and the like. References cited herein are hereby incorporated by reference in their entirety, except to the extent that they conflict with teachings explicitly set forth in this specification.

In this specification and in the claims which follow, reference will be made to a number of terms which shall be defined to have the following meanings:

"Optional" or "optionally" means that the subsequently described circumstance may or may not occur, so that the description includes instances where the circumstance occurs and instances where it does not. For example, if a device optionally contains a feature for a barrier film, this means that the barrier film feature may or may not be present, and, thus, the description includes both structures wherein a device possesses the barrier film feature and structures wherein the barrier film feature is not present.

Device Physics

The Peltier effect was first discovered when Jean Charles Athanase Peltier joined copper wire and bismuth wire together and connected them to each other, then to a battery. When he switched the battery on, one of the junctions of the two wires got hot, while the other junction got cold. If the cold junction was put inside an insulated box, it became a low-efficiency refrigerator. The Peltier effect shows that electricity can cause a heat difference at the junction of two different metals connected together.

The Seeback effect, or inverse Peltier effect, was discovered in 1821 when Thomas Johann Seebeck discovered that a circuit made of two dissimilar metals conducts electricity if the two places where the metals connect are held at different temperatures. Seebeck placed a compass near the circuit he built and noticed that the needle deflected. He discovered that the deflection's magnitude increased proportionally as the temperature difference increased. His experiments also noted that the temperature distribution along the metal conductors did not affect the compass. However, changing the types of metals he used did change the magnitude that the needle deflected.

Ferromagnetism is a phenomenon by which a material can exhibit a spontaneous magnetization, and is one of the strongest forms of magnetism. The Curie temperature (Tc) of a ferromagnetic material is defined as the temperature above which that ferromagnetic material cease to be ferromagnetic—this temperature represents a critical point due to a second order phase transition, at which point the material can no longer maintain a spontaneous magnetization. There are a number of crystalline materials that exhibit ferromagnetism and at a range of different Tc, including but not limited to crystalline materials such as Co (Tc=1388K), Fe (Tc=1043K), $FeOFe_2O_3$ (Tc=858K), $NiOFe_2O_3$ (Tc=858K), $CuOFe_2O_3$ (Tc=728K), $MgOFe_2O_3$ (Tc=713K), MnBi (Tc=630K), Ni (Tc=627K), MnSb (Tc=630K), $MnOFe_2O_3$ (Tc=573K), $YcFe_5O_{12}$ (Tc=560K), $CrO_2$ (Tc=386K), MnAs (Tc=318K), Gd (Tc=292K), Dy (Tc=88K) and EuO (Tc=69K), as well as carbon nanofoam and other carbon-based materials. For reference, 20 degrees Celsius=293.15 kelvin. For reference 25° C. (approximately room temperature) is 298.15K. For reference, 30 degrees Celsius=303.15 kelvin. For reference, 35 degrees Celsius=308.15 kelvin. For reference, 40 degrees Celsius=313.15 kelvin. For reference, 45 degrees Celsius=318.15 kelvin. For reference, 50 degrees Celsius=323.15 kelvin. For reference, 55 degrees Celsius=328.15 kelvin. For reference, 60 degrees Celsius=333.15 kelvin. For reference, 65 degrees Celsius=338.15 kelvin. For reference, 70 degrees Celsius=343.15 kelvin. For reference, 75 degrees Celsius=348.15 kelvin. For reference, 80 degrees Celsius=353.15 kelvin.

In one nonlimiting example, the Tc is in the range of about 313.15 kelvin to about 343.15 kelvin. Optionally, the Tc is in the range of about 318.15 kelvin to about 338.15 kelvin. Optionally, the Tc is in the range of about 313.15 kelvin to about 343.15 kelvin.

Coercivity, also called the coercive field, of a ferromagnetic material is defined as the intensity of the applied magnetic field required to reduce the magnetization of that material to zero after the magnetization of the sample has been driven to saturation. Coercivity is usually measured in Oersted or Ampere/Meter units and is denoted HC. Coercivity measures the resistance of a ferromagnetic material to becoming demagnetized. High coercivity materials are termed hard ferromagnets and are typically used as permanent magnets. In hard ferromagnetic materials, the magnetic domains will not shift back to their starting points when the magnetic field is removed. In contrast, for soft ferromagnetic materials, which have low coercivity, the magnetic domains of such materials return to being randomly aligned when the magnetic field is removed. Such materials are often used for magnetic recording heads and for magnetic shielding.

A piezoelectric element is a crystal which in one mode can deliver a voltage when mechanical force is applied between its faces. Piezoelectricity is a phenomenon in which positive and negative electric charges appear on opposite sides of some non-conducting crystals when subjected to mechanical pressure. Piezoelectricity exists because some atomic lattice structures have as an essential cell a cubic or rhomboid atomic cage, and this cage holds a semi-mobile ion which has several stable quantum position states inside itself. Piezoelectric transducers have been conventionally used to convert mechanical vibrations into electric signals. A piezoelectric transducer includes a vibrating piece which has on both its surfaces electrodes for converting mechanical vibrations into electrical output.

Embodiment(s) of the Invention

One approach to enabling this invention is to (1) create a solar panel whose form factor is comprised of a glass-foil laminate and whose foil back in comprised of Al foil. (2) Placement and/or deposition of a hard ferromagnetic material onto the Al foil. Such a material could be comprised of 1-10 mm of neodymium iron boron (NdFeB). (3) Placement and/or deposition of an elastic, heat conducting material onto the hard magnetic surface. Examples of such material include but are not limited to conductive polymer (e.g., CoolPoly® thermally conductive plastics, PolyOne Therma-Tech thermally conductive plastics, nylon 6-6, filled nylon 6-6, and/or a polyphenylene sulfide, optionally mixed with one or more thermally conductive fillers such as metal, ceramic, graphite, nanotubes, etc.). The material may also incorporate for example, Nylon 1020, Nylon 1040, Nylon 1240, Froton 6165A, Froton 6165D, or polyphenylene sulfide, or any other polymer. The spring constant of such elastic material should be in the range from about 10 to about 500 mN/mm, and more ideally about 100 mN/mm to about 300 mN/mm, and even more ideally about 200 mN/mm. Since the material is elastic, it serves as a spring-like material which can then perform as the oscillating media for the thermoelectric stack. (4) Placement and/or deposition of a soft ferromagnetic material on top of the elastic and heat conductive polymer layer. Soft ferromagnetic material could be 100 microns of polycrystalline Gadolinium, whose Tc (21° C.) is close to room temperature (25° C.). (5) A piezoelectric transducer is attached to the thermoelectric multilayer stack, by way of non-limiting example at the upper and lower boundaries of the heat conductive polymeric layer, and wires from the transducer element enable the migration of positive and negative charge carriers from the transducer to the edge box of the solar panel, where such charge carriers are combined with the same polarity charge carriers that collect due to the photovoaltic effect. (6) optionally a (for example piezoelectric-based) sensor can be attached to the panel to monitor the oscillation frequency of the panel over time and various environmental conditions.

Function of Embodiments of Invention

At T=0, the soft material is cold (below its curie temperature, or Tc). The hard magnetic material produces an attractive force and the two materials move closer to one another. As the cold soft material gets closer to the warm hard material, the soft material becomes warmer. With sufficient heating, the soft material temperature rises above its Tc, becomes paramagnetic, and attractive force diminishes, moving the soft material farther away from the hard material. The cycle begins again as the soft material, now below its Tc, begins to be attracted again to the hard material—and with each cycle, the mechanical energy produced can be transformed into electrical energy by means of a piezoelectric material attached to the device. The power output from the thermoelectric effect s thus related to the saturation magnetization of the soft ferromagnetic material (the magnetic force), the oscillation frequency (which will change as a function of time of day since the panel operating temperature will change during the day), and the piezoelectric conversion efficiency. The oscillation frequency may range from 1 to 30 Hz as the distance between the hard and soft magnets ranges from 0.1 to 0.8 mm.

The power density arising from a 30 Hz oscillation may be in the $mW/cm^2$ range depending upon the temperature range exhibited during cycling. For example, by using soft ferromagnetic materials which have higher saturation magnetization, and/or by optimizing the interfacial thermal conductance (in part through the use of smooth surfaces and also by minimizing any contamination between thermoelectric stack layers), frequencies as high as 1000 Hz can be achieved when the thermal gradient approaches 30° C. At these upper oscillations, which are enabled by 100 $kW/m^2$-K or higher interfacial thermal conductance, power output may exceed 35 $mW/cm^2$, or three times the power output from a PV-based solar panel (~10 $mW/cm^2$ at 10% AM 1.5 g power conversion efficiency).

Additional Benefits of Embodiments of Invention

In addition to the beneficial effect of providing a second power output from the solar panel, the cooling of the panel itself will increase the first (PV-based) power output since the solar panel's active layer will be operating at a lower temperature, increasing the power conversion efficiency from the photovoltaic effect.

Optional/Alternative Features:

The thermoelectric device stack could be formed as one continuous multilayer stack over a square meter or more panel area, could be formed as multiple discrete multilayer stacks spaced at appropriate points or regions across the panel area.

Should the thermoelectric stack experience a reverse thermal gradient, a diode can be placed before the junction box to prevent power drain (especially at night).

Nanosolar has recently measured the front glass and back electrode temperatures of the Nanosolar utility solar panel where in San Jose, Calif., on Aug. 12, 2010, and at noon time (peak sun), the back electrode has been measured at 58° C. while the front glass was measured about 55° C., for a minimum of a 3° C. temperature gradient from the front glass to the back electrode. If this temperature gradient is insufficient to enable high power output, a radiative fin design can be incorporated by molding and/or otherwise patterning the heat conductive polymer layer into a matrix pattern of radiative pins, whose aggregate effect is to enable a 20° C. or greater thermal gradient from the front to the back of the device. This range of temperature gradients should be sufficient for substantial power output.

Foil Back Layer Photovoltaic Module

Referring now to FIG. 1, one embodiment of a module 10 according to the present invention will now be described. FIG. 1 shows that the present embodiment of module 10 may include a transparent module front layer 12 followed by a pottant layer 14, a plurality of solar cells 16, optionally a second pottant layer 18, and a module back layer 20. By way of nonlimiting example, the transparent front layer 12 may be a substantially transparent glass plate that provides structural support and acts as a protective barrier. The pottant layers 14 and 18 may be of the same or different pottant materials. Optionally, some embodiments may be without a pottant layer 18 to improve thermal conductivity. Optionally, some may have a pottant with thermally conductive filler therein such as using thermally conductive filler. In one embodiment, the thermal conductivity of the pottant layer may be obtained by keeping its thickness at less than about 75 microns. The thermal conductivity of the pottant layer may be obtained by adding thermally conductive beads such as in layer 106 to thermally not very conductive adhesive. The beads added to the pottant and/or insulating layer may be ceramics. The pottant adhesive may be EVA. The back foil provides environmental protection of the module and enables heat transfer at least two orders of magnitude more easily than glass. The surface area of the module back foil may be enhanced so as to maximize heat transfer between the back foil and the surrounding atmosphere. The surrounding atmosphere may be air, a liquid, or a liquid or a gas mix with convective transport.

Advantageously, the module back layer 20 in the present embodiment may be a conductive metal foil that provides a low cost, light weight backside protective barrier for the solar cells 16 in the module 10. This type of module back layer eliminates the traditional back layer used in conventional modules which are either heavy such as glass, expensive such as Tedlar®/Aluminum/polyester/Tedlar® (TAPT) laminate, or both. A conductive foil module back layer 20 in conjunction with only one glass front layer 12 creates a significantly lighter module while retaining a robust design and simplifying module manufacturing and enabling the thermoelectric features described herein.

Referring still to FIG. 1, the various components of module 10 will be described in further detail. As seen in this embodiment, the module 10 may include a transparent front layer 12 that may be a glass plate comprised of one or more materials such as, but not limited to, conventional glass, float glass, solar glass, high-light transmission glass with low iron content, standard light transmission glass with standard iron content, anti-glare finish glass, anti-reflective finish, glass with a stippled surface, glass with a pyramidal surface, glass with textured surface, fully tempered glass, heat-strengthened glass, annealed glass, or combinations thereof. Module front layer 12 is not limited to any particular shape, and it may be rectangular, square, oval, circular, hexagonal, L-shaped, polygonal, other shapes, or combinations of any of the foregoing. The total thickness of the glass or multi-layer glass for layer 12 may be in the range of about 2.0 mm to about 13.0 mm, optionally from about 2.8 mm to about 12.0 mm. In another embodiment, the layer 12 has a total thickness of about 2.0 mm to 6.0 mm. In another embodiment, the layer 12 has a total thickness of about 3.0 mm to 5.0 mm. In yet another embodiment, the front layer 12 has a thickness of about 4.0 mm. It should be understood that in some embodiments, the transparent front layer 12 may be made of a non-glass material that provides a transparent rigid plate. Optionally, the front layer 12 whether it is glass or non-glass is substantially transparent in a spectral range from about 400 nm to about 1100 nm. Optionally, some embodiments of the present invention may have surface treatments applied to the glass such as but not limited to filters, anti-reflective layers, surface roughness, protective layers, moisture barriers, or the like. Although not limited to the following, the top layer is typically glass except those with anti-reflective finish which consists of one or more thin film layers applied to the glass.

Referring still to the embodiment of FIG. 1, the pottant layer 14 in module 10 may be any of a variety of pottant materials such as, but not limited to, ethyl vinyl acetate (EVA), polyvinyl butyral (PVB), ionomer, silicone, thermoplastic polyurethane (TPU), thermoplastic polyolefin (TPO), tetrafluoroethylene hexafluoropropylene vinylidene (THV), fluorinated ethylene-propylene (FEP), Tefzel® (ETFE), saturated rubber, butyl rubber, thermoplastic elastomer (TPE), flexibilized epoxy, epoxy, amorphous polyethylene terephthalate (PET), urethane acrylic, acrylic, other fluoroelastomers, other materials of similar qualities, or combinations thereof. The module 10 may have one or more pottant layers. Optionally, some embodiments of module 10 may have two or more pottant layers. The thickness of each pottant layer may be in the range of about 10 microns to about 1000 microns, optionally between about 25 microns to about 500 microns, and optionally between about 50 to about 250 microns. The module may use a layer of pottant that is thinner than about 200 microns. In one embodiment, the pottant layer 14 is about 100 microns in cross-sectional thickness. In another embodiment, the pottant layer 14 is about 50 microns in cross-sectional thickness. In yet another embodiment, the pottant layer 14 is about 25 microns in cross-sectional thickness.

In some embodiments where the module has two pottant layers, the second pottant layer 18 is about 100 microns in cross-sectional thickness. Optionally, the second pottant layer 18 is about 400 microns in cross-sectional thickness. Again, the thickness of the second pottant layer may be between the range of about 10 microns to about 1000 microns, optionally between about 25 microns to about 500 microns, and optionally between about 50 to about 250 microns. The pottant layers 14 and 18 may be of the same or different thicknesses. They may be of the same or different pottant material. Although not limited to the following, the pottant layers 14 or 18 may be solution coated over the cells or optionally applied as a sheet that is laid over cells under the transparent module layer 12. Further details about the pottant and other protective layers can be found in commonly assigned, co-pending U.S. patent application Ser. No. 11/462, 359 filed Aug. 3, 2006 and fully incorporated herein by reference for all purposes. It should be understood the highly heat transmitting pottant materials may also be used and further details on such materials can be found in commonly assigned, co-pending U.S. patent application Ser. No. 11/465, 783 filed Aug. 18, 2006 and fully incorporated herein by reference for all purposes.

It should be understood that the solar module 10 and any of the solar modules herein are not limited to any particular type of solar cell. The solar cells 16 may be silicon-based or non-silicon based solar cells. By way of nonlimiting example, the solar cells 16 may have absorber layers comprised of silicon (monocrystalline or polycrystalline), amorphous silicon, organic oligomers or polymers (for organic solar cells), bi-layers or interpenetrating layers or inorganic and organic materials (for hybrid organic/inorganic solar cells), dye-sensitized titania nanoparticles in a liquid or gel-based electrolyte (for Graetzel cells in which an optically transparent film comprised of titanium dioxide particles a few nanometers in size is coated with a monolayer of charge transfer dye to sensitize the film for light harvesting), copper-indium-gallium-selenium (for CIGS solar cells), CdSe, CdTe, Cu(m, Ga)(S, Se)$_2$, Cu(m, Ga, Al)(S, Se, Te)$_2$, and/or combinations of the above, where the active materials are present in any of several forms including but not limited to bulk materials, micro-particles, nano-particles, or quantum dots. Advantageously, thin-film solar cells have a substantially reduced thickness as compared to silicon-based cells. The decreased thickness and concurrent reduction in weight allows thin-film cells to form modules that are significantly thinner than silicon-based cells without substantial reduction in structural integrity (for modules of similar design). The solar cells 16 may have various cross-sectional thicknesses. In one embodiment, it may be about 300 microns in cross-sectional thickness. Other cells may have thicknesses in the range of about 30 microns to about 1000 microns or optionally, 50 microns to about 500 microns.

Referring still to FIG. 1, to provide a reduced material cost and simplified module design, a foil module back layer 20 may be used. Although not limited to the following, the foil may be a bare foil that forms the backside surface of the module without additional coatings on the expose foil surface. The module back layer 20 may be a conductive foil comprised of one or more of the following materials: aluminum, zinc-aluminum alloy coated steel (such as Galvalume®), Corrtan® steel (a controlled corrosion steel with an adherent oxide), tin-coated steel, chromium coated steel, nickel-coated steel, stainless steel, galvanized steel, copper, conductive-paint coated metal foil such as weather resistant polymer containing carbon fiber, graphite, carbon black, nickel fiber, nickel particles, combinations thereof, or their alloys. In one embodiment, the low cost module back layer 20 is an externally exposed aluminum foil. Although not limited to the following, the cross-sectional thickness of the aluminum foil may be between about 10 μm to about 1000 μm, optionally between about 50 μm, and about 500 μm, or optionally between about 50 μm and about 200 μm. Such thicknesses may be desirable to provide for pinhole-free, cut-resistant, wrinkle-resistant performance. The use of a low cost, lightweight, corrosion resistant material is desirable to reduce cost and simplify module design.

Figure 2:
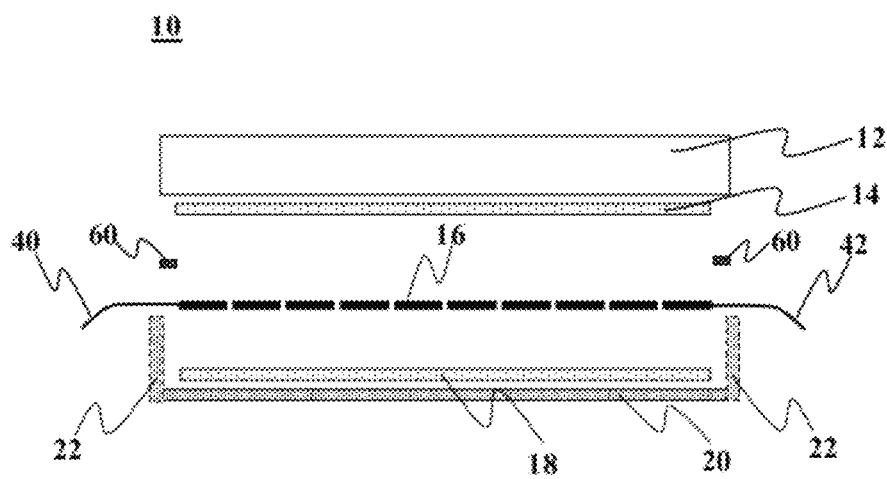
FIG. 2 shows an exploded side view of the photovoltaic module of FIG. 1.
Figure 4:
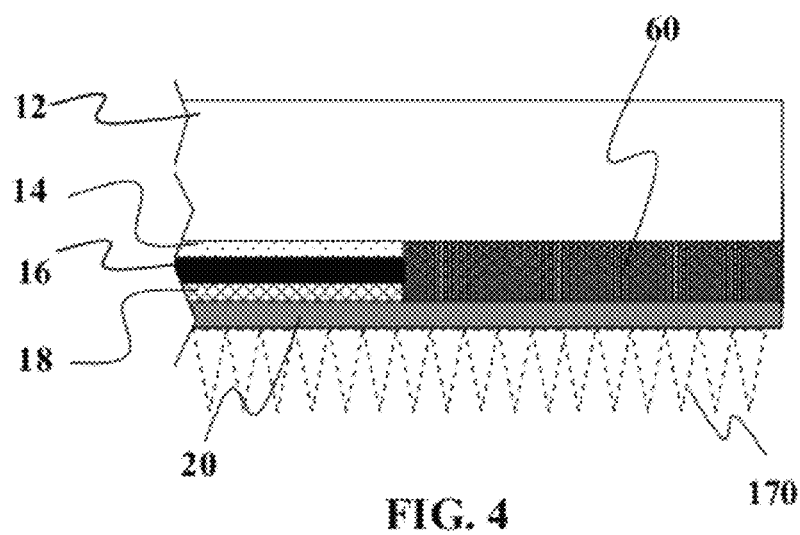

As seen in FIG. 2, the module back layer 20 may also be of various sizes and shapes and is not limited to being a rectangular sheet of material in only one plane of the module. FIG. 2 shows a cross-sectional view of the module of FIG. 1. By way of nonlimiting example, some embodiments of the module back layer 20 may be sized to cover not only the back of the module 10 but also include portions 22 (shown in phantom) which may extend to cover one or more of the side edges of the module 10. The use of vertical portions 22 of module back layer 20 may improve the moisture barrier quality of the module 10 as it provides a continuous length of material that covers both the back of module and possible sideways moisture entry points from between the module front layer 12 and the module back layer 20. As the portions 22 are continuous with the layer 20, this reduces the number seams or seals that would exist if these elements were separate pieces. Additional details of the fold seal formed along the edges of module 10 are described in FIG. 4.

Referring still to FIG. 2, the present embodiment of module 10 shows a frameless module without a central junction box with electrical ribbons 40 and 42 for electrically coupling adjacent modules together. Although not limited to the following, the electrical lead wires/ribbons 40 and 42 may extend outward from between the module front layer 12 and the module back layer 20. These ribbons 40 and 42 are designed to exit along the sides of the module, between the various layers 12 and 20, rather than through them. This simplifies the issue of having to form openings in back layer or the front layer which may be an issue if the openings are improperly formed during such procedures. The electrical lead 42 may extend from one side of the cell 16 (either top or bottom) and not necessarily from the middle. The ribbon 40 may connect to a first cell in a series of electrically coupled cells and the ribbon 42 may connect to the last cell in the series of electrically coupled cells. The wires or ribbons 40 and 42 may optionally have a coating or layer to electrically insulate themselves from the backsheet 20. Optionally in some alternative embodiments, the wires or ribbons 40 and 42 may exit through an opening in the conductive metal foil layer. FIGS. 1 and 2 also show that a moisture barrier 60 may be positioned around the perimeter of the module. This barrier 60 may be at least partially enclosed by the module front layer 12 and module back layer 20. The barrier 60 may be comprised of a seal material alone or a seal material loaded with desiccant.

Figure 3:
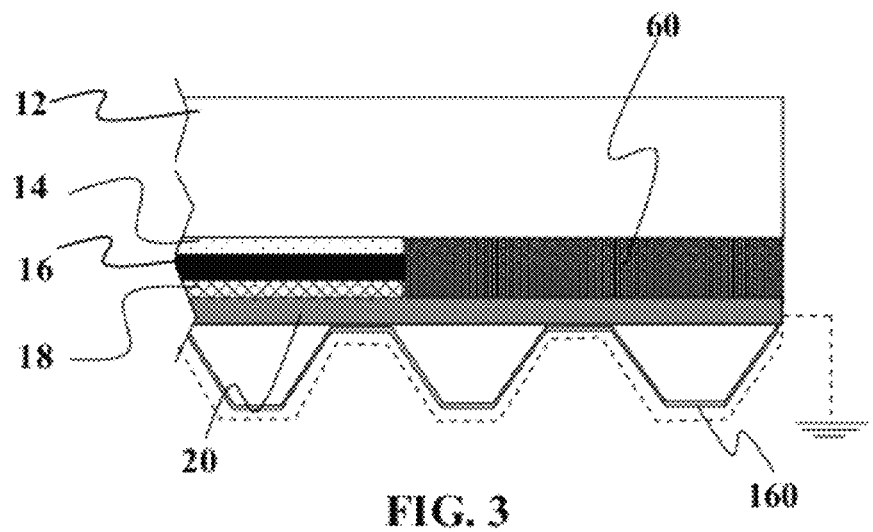
FIGS. 3 and 4 show side cross-sectional views of portions of various photovoltaic modules according to embodiments of the present invention.

Referring now to the embodiment of FIG. 3, it should be understood that additional stiffening elements may be added to the module for protective purposes. FIG. 3 shows a corrugated structure 160 coupled to the underside of the module, in this case to the module back layer 20. The corrugated structure 160 may made of the same material as the module back layer 20, or optionally, it may be a different material. The structure 160 may be comprised of aluminum, aluminum alloy, copper, steel, stainless steel, galvanized steel, polymers, plastics, or the like. The thickness of the corrugated structure 160 as indicated by arrow 162 is in the range of about 2 mm to about 5 mm. The corrugation may be placed over the entire backside of the module, or optionally, it may be placed at specific locations where the module is mechanically coupled to ground support or other mounting elements. The material used for structure 160 may be about 75 microns or thicker, to provide the desired cut resistance.

Optionally, instead of corrugation, some module back layers 20 may be embossed or stamped with undulations or texturing to provide additional structural support. The embossing or stamping may also be useful for address any thermal expansion issues that may arise. Optionally, some embodiments may use a plurality of radiative fins and/or pins. Optionally, some may use a flat layer of material coupled to the back side of the module. In this embodiment, the thermoelectric material can be coated on to the structure 160 or 170.

Referring now to FIGS. 5 through 8, it should be understood that the backside structure that provides the thermoelectric effect can include a hard material 200 (hard ferromagnet) and a soft material 204 (soft ferromagnetic material). In between may be an elastic material that is heat conductive 202 or heat resistive 208. Optionally, some embodiment may be a combination of both heat conductive 202 and heat resistive 208 material to improve the rebound effect and facilitate oscillation.

Figure 5:
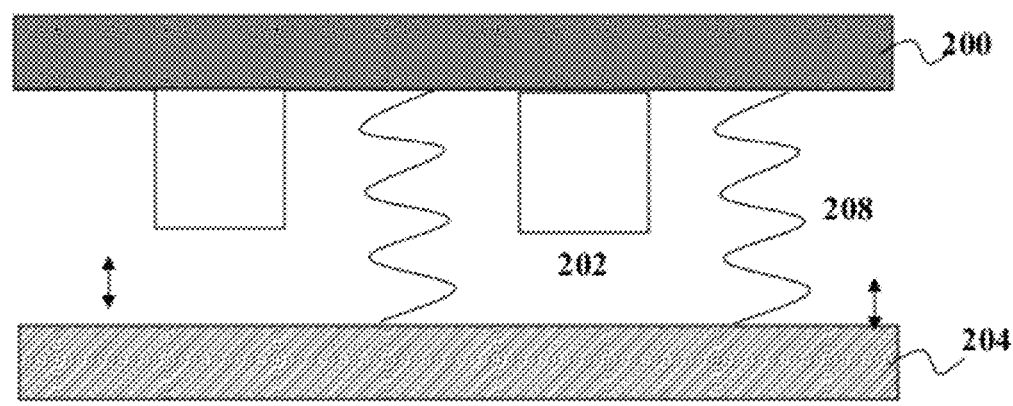
FIG. 5 shows a schematic of one embodiment of a thermoelectric system suitable for use with a photovoltaic module according to an embodiment of the present invention.
Figure 6A:
FIGS. 6a to 7 show side cross-sectional views of systems according to embodiments of the present invention.
Figure 6B:
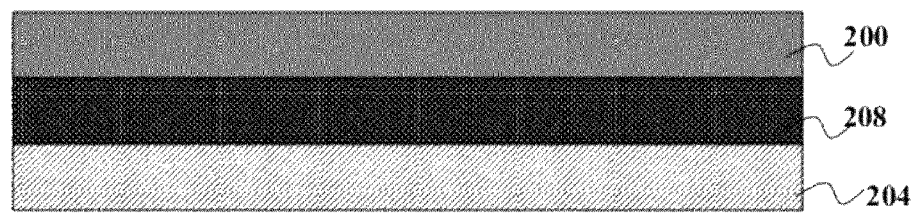
Figure 7:
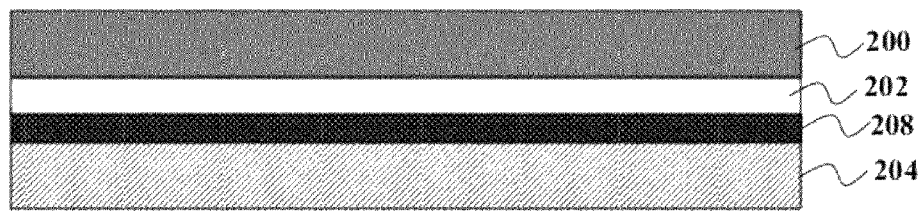

FIG. 5 schematically illustrate how each component can function. In FIG. 5, the motion of the soft material 204 is bounded by a heat conductive material 202 that is at the upper bound so that when the material 204 comes closer, it heats up the material 204 causing it to move away. But, the heat resistive material 208 helps cool the material 204 that then cause 204 to want to move upward to toward material 200. This combination of heat resistive and heat conductive material can be used to improve device performance.

It should be further understood that any of the embodiments herein can be modified to incorporate or be fabricated using one or more of the following.

Deposition methods: the material for use in the thermoelectric device can be deposited using a variety of methods but not limited to sputtering, evaporation, CBD, electroplating, CVD, PVD, ALD, and the like.

Recycling ALD organometallic precursors can be used to reduce overall costs. U.S. patent application Ser. No. 10/782,545, 10/782,233, and 10/943,658 are fully incorporated herein by reference.

Tuning: embodiments of the present invention may tune Curie temperature of the soft or hard material by codeposition of two or more materials with different Curie temperatures to reach a combined material with the desired coefficient.

The spring constant of the materials can be tuned by adding filler.

Tune soft magnetic layer to enhance ferromagnetic effect but still flexible enough to vibrate or oscillate.

The vibration or oscillation of the system can create sound that can be used to determine for diagnostic purposes the working condition of the device. Optionally, it can be used for environmental enhancement purposes such as music production using different tuned panels.

Piezoelectric element placement on the back side of the module will be based on locations of harmonic nodes to enable collection of electrical energy at the maximum points of energy generation.

PET, anodized aluminum, or other insulating back layer to maintain electrical resist on the backside of the material.

Diode to Prevent any Drain

Electrical cabling can be joined to the junction box carrying current from front side PV. Optionally, separate cabling can be incorporated so that the electrical power from the backside of the module which may be a lower voltage (5v) and/or amperage is separated from power generated from the front side of the panel.

Any or all of the various materials properties of the thermoelectric and/or piezoelectric device stack can be tuned for optimal function in the solar panel.

Tuning the Magnetic Properties of the Hard Material

The properties of the hard magnetic material, including but not limited to the magnetic moment (also called magnetic dipole moment), as well as the magnetization of the material (defined as the local value of its magnetic moment per unit volume) can also be tuned by a range of techniques including but not limited to the co-deposition of multicomponents for example in a thin-film alloy. The relative fraction of each material will contribute to the aggregate, mixed material properties, enabling tuning of a multicomponent alloy to a particular set of materials attributes. Two or more materials can be intermixed, Co-deposition techniques include but are not limited to pulsed laser deposition, physical vapor deposition, chemical vapor deposition, atomic layer deposition, evaporation, sputtering, electrodeposition, chemical bath deposition, chemical mixing, solution-based deposition, vapor-based deposition, electroless plating, mixtures of any of the above and/or other deposition techniques, and the like. Thermal and/or magnetic annealing can be applied to tune the extent of structural order such as crystallinity and the length scale over which such order occurs. For example, a magnetic material can be amorphous, nanocrystalline, microcrystalline, or crystalline.

Tuning the Properties of the Elastic Component

The attributes of the elastic polymer or other spring-like material can be tuned for optimal device function. Tunable attributes include but are not limited to thermal conductivity and elasticity (as measured for example by shear modulus, loss tangent, thermal expansivity, and elasticity change vs. temperature). Thermal conductivity can be adjust by mixing two or more materials with different conductivities (for example the mixing of a heat conductive and a heat insulator) together, either in a random mixture or in in a non-random aggregation of materials (for example a bilayer or trilayer). By way of nonlimiting example, the materials may be polymers or other materials with different thermal conductivities. Similarly, different materials with different elasticities (for example measured by their respective spring constants) can also be mixed as appropriate to achieve an optimally tuned elasticity for function as a thermal energy harvesting device in a solar panel. One example of a potential material is Polydimethylsiloxane (PDMS) is a commercially available physically and chemically stable photocurable silicone rubber which has a unique flexibility ($G \approx 250$ kPa) at room temperature. Further properties of PDMS are a low elasticity change versus temperature (1.1 kPa/° C.), no elasticity change versus frequency and a high compressibility.

Tuning the Ferromagnetic Properties of the Soft Material

Curie temperature and saturation magnetization can be increased by increased film thickness (Shen et al, Surface Science Reports 52 (2004) 163-218). The ferromagnetic properties of certain materials can also be tuned through hydrogenation and post hydrogenation (Theynard et al., Applied Physics Letters 87 (2005) 182506). Both references are fully incorporated herein by reference for all purposes. However, these techniques are relatively slow throughput and incur substantial cost due in part to their slow production speed. An alternative approach is the co-deposition of multicomponent thin film materials to tune their ferromagnetic properties, and in particular their curie temperatures and saturation magnetizations, by intermixing different co-deposited materials with different curie temperatures and saturation magnetizations. The relative fraction of each material will contribute to the aggregate, mixed material properties, enabling tuning of a multicomponent alloy to a particular set of materials attributes. For example, the curie temperature of a multicomponent ferromagnetic thin film alloy can be tuned to be set within the range of operating temperature(s) of a solar panel so that the curie temperature of the material is regularly experienced by the material during the regular course of operation of the solar panel incorporating that material, for example as a thermoelectric harvesting stack on the back of such a panel. Further, the saturation magnetization can be tuned to an optimal level to increase the potential power output of such a device. Moreover, the permeability (the measure of the ability of a material to support the formation of a magnetic field within itself) and/or hysteresis loss (the change in energy converted to heat in a material because of magnetic or other hysteresis, accompanying cyclic variation of the magnetic field or other driving variable) can be tuned through the mixing of different materials. Two or more materials can be intermixed, Co-deposition techniques include but are not limited to pulsed laser deposition, physical vapor deposition, chemical vapor deposition, atomic layer deposition, evaporation, sputtering, electrodeposition, chemical bath deposition, chemical mixing, solution-based deposition, vapor-based deposition, electroless plating, mixtures of any of the above and/or other deposition techniques, and the like. Thermal and/or magnetic annealing can be applied to tune the extent of structural order such as crystallinity and the length scale over which such order occurs. For example, a magnetic material can be amorphous, nanocrystalline, microcrystalline, or crystalline.

Tuning the Properties of the Piezoelectric Component

The properties of the piezoelectric material can also be tuned to optimize the relationship between the extent to which electrical charge is internally generated arising resulting from a mechanical force. Many materials, both natural and man-made, exhibit piezoelectricity, including (i) naturally occurring crystals such as Berlinite ($AlPO_4$), a rare phosphate mineral that is structurally identical to quartz, cane sugar, quartz, Rochelle salt, Topaz, and Tourmaline-group minerals, (ii) biomaterials such as collagen, tendons, silk, wood, enamel, and dentin, (iii) synthetic crystals such as Gallium orthophosphate ($GaPO_4$), a quartz analogic crystal, and Langasite ($La_3Ga_5SiO_{14}$), a quartz analogic crystal, and synthetic ceramics with perovskite or tungsten-bronze structures exhibits such as Barium titanate ($BaTiO_3$), Lead titanate (Pb-$TiO_3$), Lead zirconate titanate ($Pb[Zr_xTi_{1-x}]O_3$ $0<x<1$)— more commonly known as PZT, Potassium niobate ($KNbO_3$), Lithium niobate ($LiNbO_3$), Lithium tantalate ($LiTaO_3$), Sodium tungstate ($Na_2WO_3$), $Ba_2NaNb_5O_5$, $Pb_2KNb_5O_{15}$, and (iv) lead-free piezoceramics such Sodium potassium niobate (NaKNb), Bismuth ferrite ($BiFeO_3$), and Sodium niobate $NaNbO_3$, and (v) polymers such as Polyvinylidene fluoride (PVDF): PVDF exhibits piezoelectricity several times greater than quartz. Unlike ceramics, where the crystal structure of the material creates the piezoelectric effect, in polymers the intertwined long-chain molecules attract and repel each other when an electric field is applied. Mixtures of any or all of these materials can be combined to achieve the desired piezoelectric properties. Co-deposition techniques include but are not limited to pulsed laser deposition, physical vapor deposition, chemical vapor deposition, atomic layer deposition, evaporation, sputtering, electrodeposition, chemical bath deposition, chemical mixing, solution-based deposition, vapor-based deposition, electroless plating, mixtures of any of the above and/or other deposition techniques, and the like.

Referring now to FIGS. 8 through 12, it should be understood that the location of thermoelectric elements, including how layers of material are distributed, can optionally be based on standing wave patterns that may occur on the back side of the panel.

Figure 8:
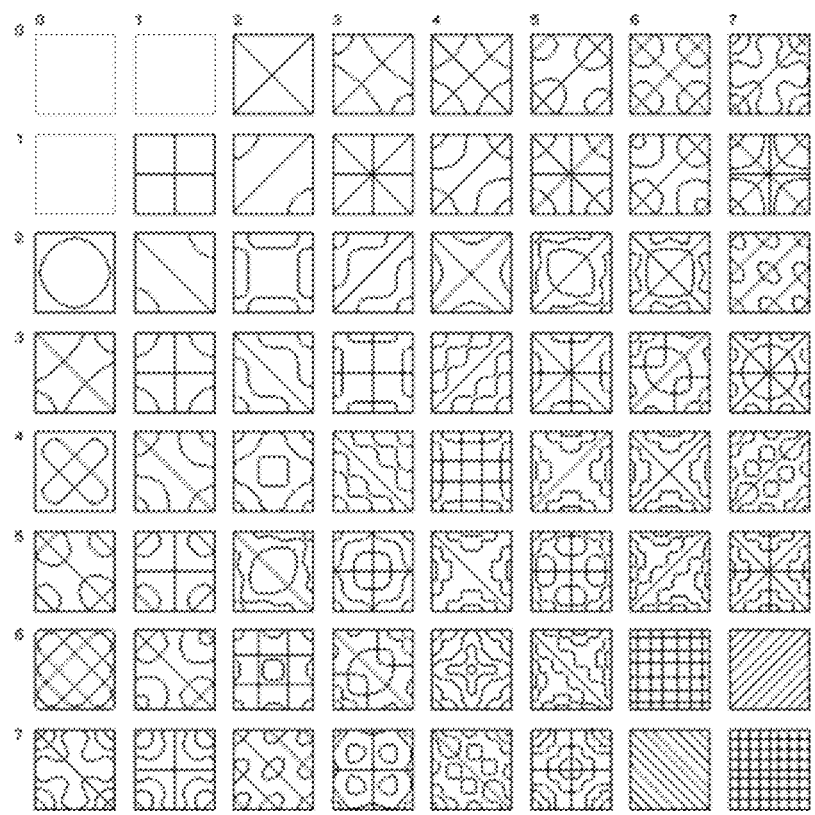
FIGS. 8 to 10 show harmonic patterns for use in guiding placement of thermoelectric elements according to embodiments of the present invention.

FIG. 8 shows a plurality of possible standing wave patterns (2D) as viewed from one side of the module (looking upward or downward). The location of elements such as but not limited to the piezoelectric elements can be a node locations or at anti-nodes depending on whether a destructive or constructive wave form is desired.

Figure 9:
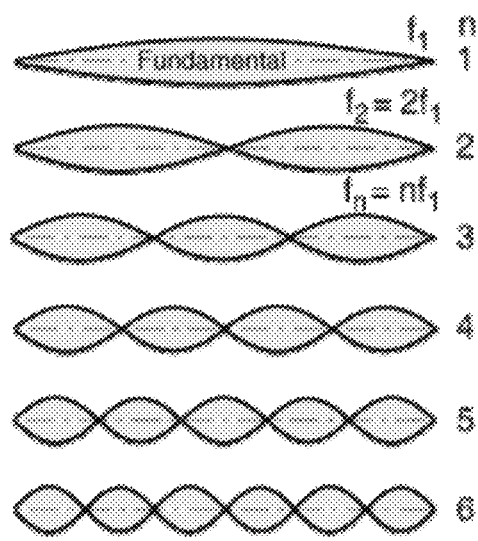

Referring to FIG. 9, a standing wave can have a series of nodes (zero displacement) and anti-nodes (maximum displacement) at fixed points along the line. In one dimension, two waves with the same frequency, wavelength and amplitude traveling in opposite directions will interfere and produce a standing wave or stationary wave. For example: a wave traveling to the right along a taut string and hitting the end will reflect back in the other direction along the string, and the two waves will superpose to produce a standing wave. The reflective wave has to have the same amplitude and frequency as the incoming wave.

Figure 10:
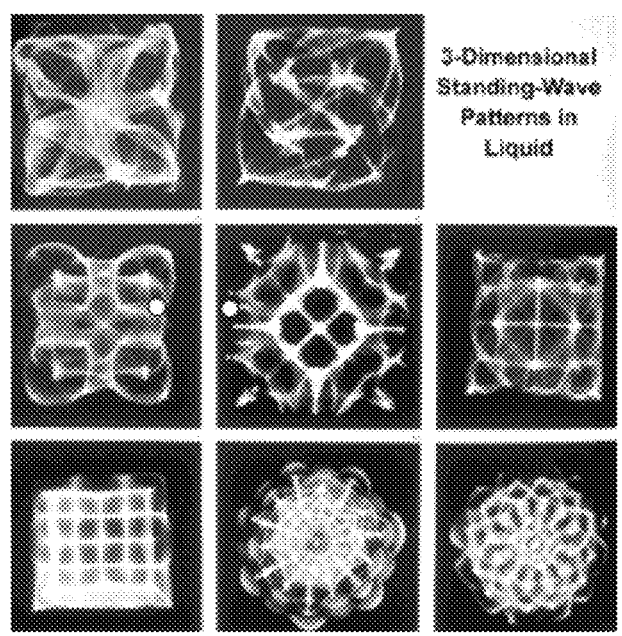

FIG. 10 shows still further patterns of standing waves which can be used as guides for positioning current collection elements of the present invention.

Figure 11:
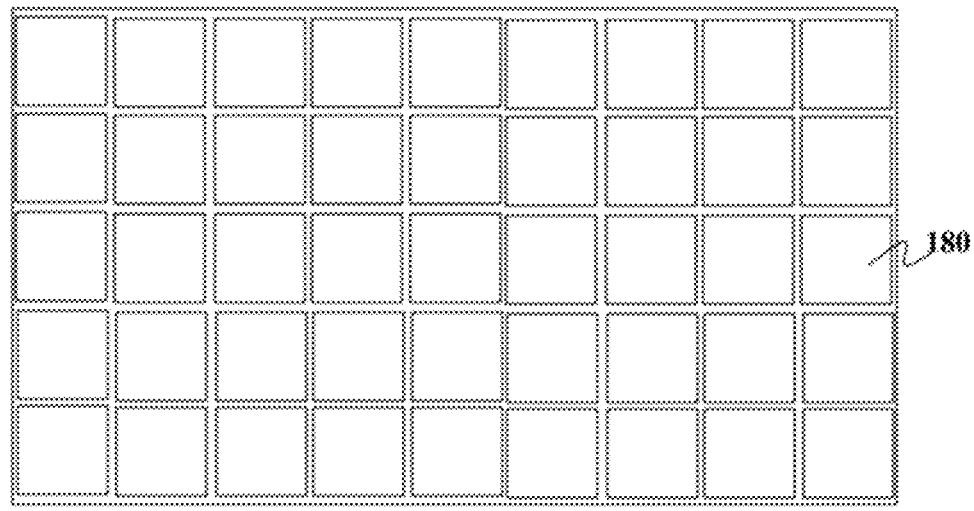
FIGS. 11 and 12 show views of thermoelectric elements mounted to an underside of a photovoltaic module according to embodiments of the present invention.

FIG. 11 shows an embodiment wherein individual areas 180 that can optionally match positions of cells can be used to help "sheppard" or guide electrical current in the overlying PV cells based on the magnetic field generated by the thermoelectric device. Thus, each of the areas can be tuned to help guide the electrical flow of the overlying PV cell, in addition to generating its own electricity. Shepherding of current can occur cell by cell, or some modular level in sections or portions of the module.

Figure 12:
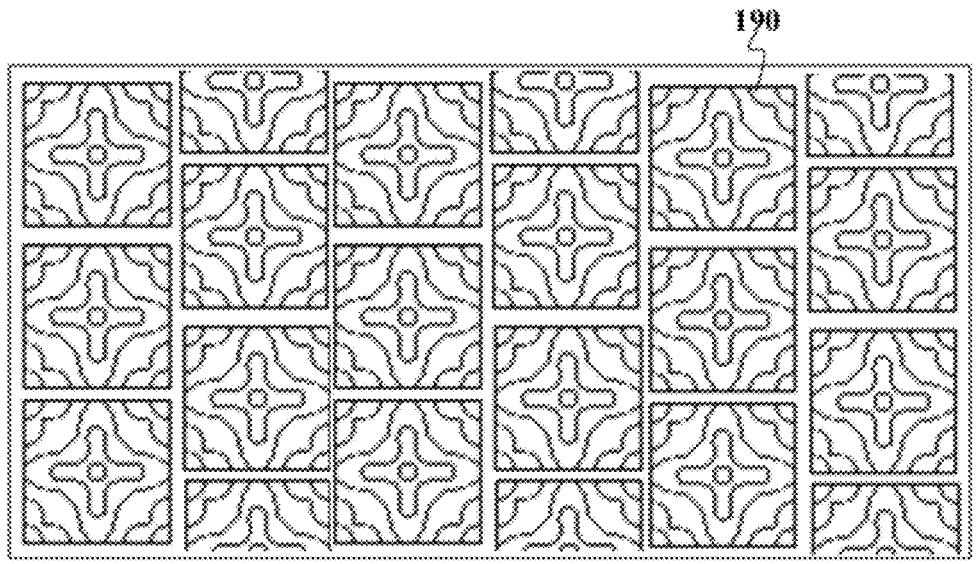

FIG. 12 shows an embodiment wherein each of the thermoelectric elements 190 can have layers of material in pattern (based on different material composition, thickness, stiffness, or the like) to match the resonant patterns that may occur. This can be used for a variety of purposes such as but not limited to increasing electrical output or maximizing capture of electrically generated.

Optionally, harmonic mapping can be used to tune resonant properties of one or more the layers (hard magnetic, soft magnetic, etc. . . . ) to enable the device manifest a desired output and determine where to place the collection units. By way of nonlimiting example, tuning can involve one or more of the following: thickness variation, stiffness of material, or varying Tc of material. Thus, the tuning can occur a) magnetically: such as by changing material property changes (such as controlling the saturation level of the soft or hard magnetic material) or b) mechanically: changing the elastic properties of the material, the spring constant to vary resonant frequency or it could be the mechanical stiffness of the hard or soft magnet.

Optionally, a variety of diagnostic indicators such as LED lights (red if system is performing out of spec) or certain RFID tags can be used if it is determined that the PV and/or thermoelectric portions of the panel are functioning irregularly or out-of-specification.

If the string is held at both ends, forcing zero movement at the ends, the ends become zeroes or nodes of the wave. The length of the string then becomes a measure of which waves the string will entertain: the longest wavelength is called the fundamental. Half a wavelength of the fundamental fits on the string. Shorter wavelengths also can be supported as long as multiples of half a wavelength fit on the string. The frequencies of these waves all are multiples of the fundamental, and are called harmonics or overtones. For example, a guitar player can select an overtone by putting a finger on a string to force a node at the proper position between the ends of the string, suppressing all harmonics that do not share this node.

Standing waves can be mechanically induced into solid medium using resonance. In the present embodiment, the movement of the thermoelectric device can be maximized at the select locations based on positions of nodes and anti-nodes in the pattern.

Integration of Photoelectric and Thermoelectric Functions

In one embodiment of the present invention, the power output from the photovoltaic device sited on the front of the solar panel can either be combined with the power output from the coupled thermoelectric and pizeoelectric device sited on the back of the device to provide an integrated power output for another use, or, the power output from the front of the device can be optionally used to extend the operating range on the back of the device by using the photovoltaically derived power to tune the operating temperature on the back of the device, either through cooling, or through heating, or through both cooling and heating. In this way the power output from the coupled thermoelectric and piezoelectric device sited on the back of the device can be increased by optimizing the temperature at which it is operating, in part by using the power output from the photovoltaic front of the device.

Figure 13A:
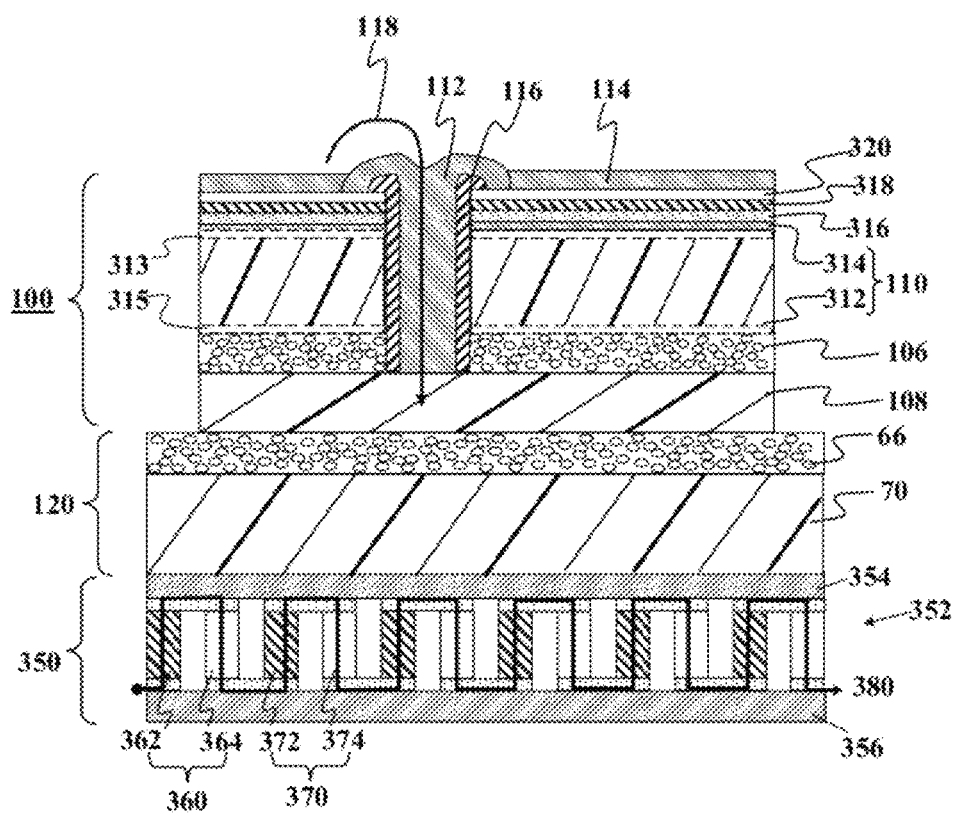
FIGS. 13A and 13B show side cross-sectional views of solar panels according to various embodiments of the present invention.
Figure 13B:
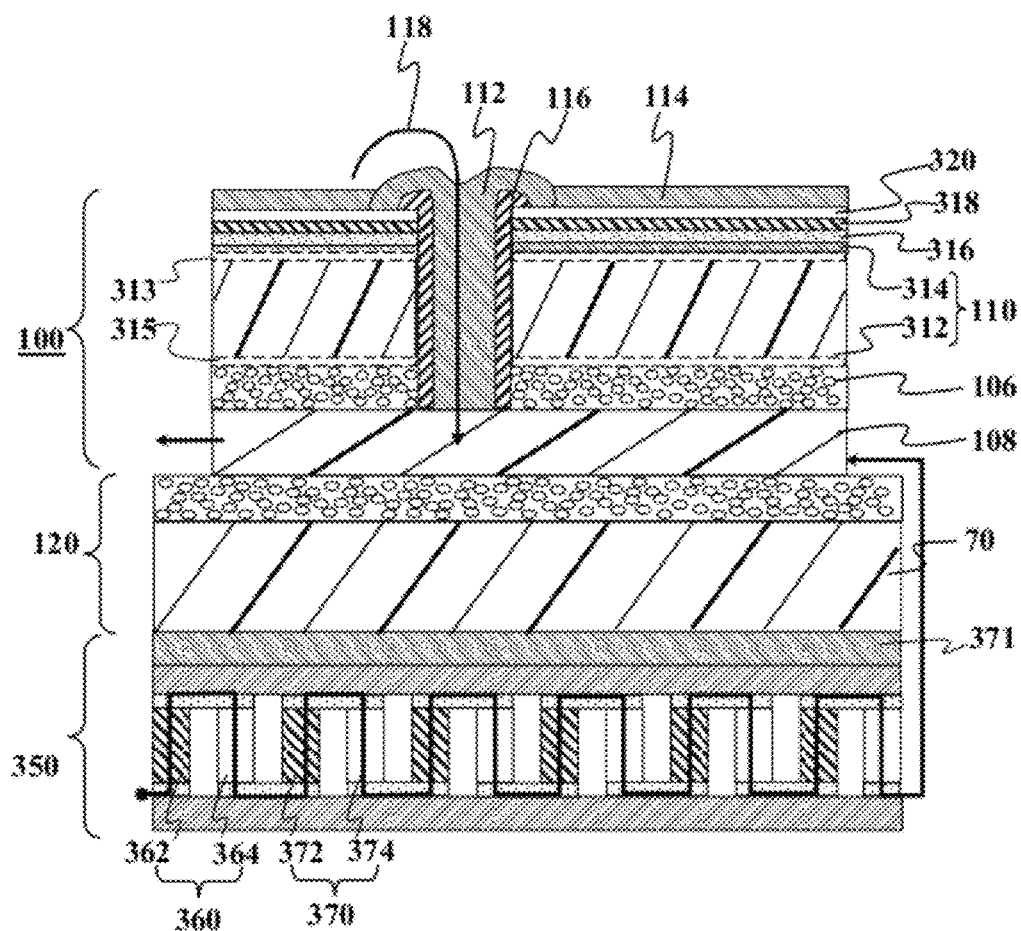

Referring now to FIGS. 13A and 13B, it should be understood that the thermal management schemes described herein may be adapted for use in a high efficiency cell configuration as detailed below. FIG. 13A illustrates a solar cell 100 attached to an electrically insulating carrier substrate 66, which may be made of a plastic material such as polyethylene terephthalate (PET), e.g., about 50 microns thick. The carrier substrate 66 may, in turn, be attached to a thicker structural membrane 70 to facilitate mounting of the module.

The device 10 includes a base substrate 312, an optional adhesion and/or diffusion barrier layer 313, a base or back electrode 314, an absorber layer 316 incorporating a film of the type described above, a semiconductor thin film 318, and a transparent electrode 320. Although not limited to the following, the absorber layer 316 may be a thin-film absorber layer. The semiconductor thin film 318 serves as a junction partner between the compound film and the transparent conducting layer 319. Optionally, a diffusion layer 315 (shown in phantom) may be on the underside of substrate 312 and be comprised of a material such as but not limited to chromium, vanadium, tungsten, or compounds such as nitrides (including tantalum nitride, tungsten nitride, titanium nitride, silicon nitride, zirconium nitride, and/or hafnium nitride), oxides, carbides, and/or any single or multiple combination of the foregoing. This layer 315 may be adapted for use with any of the embodiments described herein.

By way of nonlimiting example, the solar cell 100 may use a high efficiency metal wrap-through (MWT) configuration. The high efficiency solar cell 100 includes the p-type absorber layer 316 and other layers as set forth above in FIG. 14A. In addition to those layers, the solar cell 100 also includes an electrically insulating layer 106 and a conductive back plane 108. The use of back plane 108 can be very advantageous as will be described below. The electrically insulating layer 106 may be located between the bottom electrode 110 and the conductive back plan 108. Optionally, the layer 106 includes particles similar to those found in layer 66 which improves heat transfer through the layer without substantially increasing electrical conductivity. In one embodiment, the bottom electrode 312 includes a first metal foil and the conductive back plane 108 includes a second metal foil.

It should be understood that in some embodiments of the present invention, the back plane 108 may be described as a backside top electrode 108. This is because a via filled with electrically conductive material 112 electrically couples the transparent conductive electrode 320 and fingers 114 on the front side of the solar cell with the back plane 310, wherein insulating layers 116 insulate the sidewalls of the via. The electrical conduction path is indicated by arrow 118. This allows for narrower fingers on a topside surface since electrical current is carried along the backside and the fingers are only needed to gather the electrical current from the topside. Narrower fingers and/or fewer fingers means that more surface area of the solar cell can receive sunlight, and this increase in surface area exposure also increases electrical output. Additionally, the electrical conduction path 118 is also representative of thermal conduction path through the material 112 to draw heat away from the absorber layer of the cell 100.

In the present embodiment, at least the bottom electrode 312 is made of a metal foil, such as but not limited to aluminum foil. Alternatively, copper, stainless steel, titanium, molybdenum, other suitable metal foils, or combinations thereof may be used. The back plane 108 may be made of similar metal material. Hybrid materials previously discussed may also be used. The use of these electrically conductive materials creates highly thermally conductive pathways through which heat may be extracted away from the device layers 102 in contact with a bottom electrode 104.

Referring still to FIG. 13A, in addition to using thermally efficient solar cells, improvements may also be made at the module level. One technique involves improving the thermal conductivity of the module backsheet. FIG. 13A shows that a highly thermally conductive backsheet 120 may be used, comprising of an electrically insulating, thermally conductive layer 66 and a thermally conductive support layer 70. These layers may be similar to those described in FIG. 2. Optionally, the present invention may also include a heat sink 122 with fins 124 (shown in phantom) attached to the underside surface of the backsheet 120. The fins 124 create greater surface area for heat to be carried away from the heat sink 122 by way of air convection. The fins 124 define a 3-dimensional laminar structure where air convection carries heat away from via a thermal path as indicated by arrow 62. The air convection may be via forced air (e.g. fan, blower, etc. . . . ) or by natural convection.

FIG. 13A shows the thermoelectric converter 350 includes an array 352 of thermoelectric couples. Each couple includes a p-type semiconductor element and an n-type semiconductor element. For example, couple 360 includes p-type semiconductor element 362 and n-type semiconductor element 364 and couple 370 includes p-type semiconductor 372 and n-type semiconductor 374. The p-type elements may be undoped Bismuth Telluride ($Bi_2Te_3$) and the n-type elements may be Antimony Telluride ($Sb_2Te_3$). Other suitable materials, however, are not excluded. Si80Ge20 alloys may be used as the thermoelectric material in thermoelectric generators and radioisotopes as the heat source, with the system operating at a maximum temperature of 900° C. and a heat to electricity energy conversion efficiency of 6%. A large increase in the ZT has been reported in recent years on Bh Te3/Sb2 Te3 superlattices, and PbTe/PbSe superlattices, wherein thermoelectric figure of merit is Z and the average temperature is T. Optionally, the ZT material is a nanostructured bulk thermoelectric materials with significantly enhanced ZT, especially Bi2 Te3-based materials.

FIG. 13A also shows that the current flow from the thermoelectric device is as indicated by arrow 380. This is shown to be separate from the current generated by the photovoltaic portion of the device. Layer 354 is the "hot" side and layer 356 is the "cold" side of the thermoelectric device. The greater the temperature differential, the greater the amount of electricity is produced. Fins or other heat dissipation or cooling device may be added to the cold side to increase device performance.

FIG. 13B shows that there may be an electrically insulating but thermally conductive layer 371. The configuration in FIG. 13B shows that current from the thermo electric device will feed into the base electrode 108 of the solar cell 100.

One technique for incorporating a highly thermally conductive solar cell as part of a solar module having a plurality of solar cells will now be described in further detail. The module may have a backsheet on which the plurality of solar cells are mounted. To maximize the benefits of a highly thermally conductive solar cell, the module should use a highly thermally conductive backsheet to provide a thermal conduction path for heat to escape from the solar cell. Without a thermally conductive backsheet, heat from the solar cell would be trapped by conventional backsheet material which is thermally insulating.

The thermally conductive backsheet may be comprised of a plurality of discrete layers. One layer may be a thermally conductive encapsulant layer. Another layer may be a thermally conductive, electrically insulating layer. Yet another layer may be a thermally conductive substrate layer that provides structural support. Still another layer may be a thermally conductive, weather resistant layer that protects the other interior layers. The layers may contain particles dispersed in the layers to improve thermal conductivity. These particles may be of various shapes and/or sizes. The particle shapes may be spherical, rod-like, polygonal, or combinations thereof. Particles may also be made from only one material. Optionally, some particles may be of one material while others are of one or more other materials. The particles are preferably of a material that is electrically insulating and highly thermally conductive. Optionally, the particles may be formed from an electrically conductive and thermally conductive material. If the material is both thermally and electrically conductive, the particles are preferably held in a material that is electrically insulating. In this manner, the electrical insulating properties are maintained while the thermal conductivity properties are improved. By way of nonlimiting example, the particles may be made of one or more of the following materials: alumina, aluminum nitride, boron nitride, zinc oxide, beryllia, silicon, diamond, isotopically pure synthetic single crystal diamond, and/or combinations thereof. A commercially available form of aluminum nitride sold under the trade name Hi-Therm™ Aluminum Nitride is also suitable for use with the present invention. Other embodiments of the present invention may use micronized silver with dispersing agents on the particles to disperse them in the material. Some of the particles may be coated with alumina (such as by anodization or ALD) to facilitate dispersion in the layer. The resulting layer, such as but not limited to the thermally conductive, electrically insulating layer, may have a thermal conductivity in the range of about 0.002 to about 0.1, optionally 0.004 to about 0.04, or optionally about 0.004 to about 0.02 (W/cm ° C.).

The thermally conductive encapsulant layer serves as a pottant layer on the backsheet. The thermally conductive encapsulant layer may be comprised of one or more of the following materials (mixed with the particles): ethyl vinyl acetate (EVA), polyvinyl butyral (PVB), ionomer, silicone, thermoplastic polyurethane (TPU), thermoplastic elastomer polyolefin (TPO), tetrafluoroethylene hexafluoropropylene vinylidene (THV), fluorinated ethylene-propylene (FEP), saturated rubber, butyl rubber, thermoplastic elastomer (TPE), flexibilized epoxy, epoxy, amorphous polyethylene terephthalate (PET), urethane acrylic, acrylic, other fluoroelastomers, or combinations thereof. The layer thermally conductive, electrically insulating serves as an electrically insulating layer on the backsheet. The thermally conductive, electrically insulating layer may be comprised of one or more of the following (mixed with the particles): PET, polyethylene naphthalate (PEN), polyvinylfluoride (PVF), ethylene tetrafluoroethylene (ETFE), Poly(vinylidene fluoride) (PVDF), polychlorotrifluoroethylene (PCTFE), FEP, THV, fluoroelasomer, fluoropolymer, polyamide, polyimide, polyester, or combinations thereof. The thermally conductive substrate layer serves as a structure layer on the backsheet and may be comprised of aluminum, stainless steel, tinned copper, copper, chromed steel, galvanized steel, galvalume steel, nickel plated steel, tin, titanium, or molybdenum. The thermally conductive, weather resistant layer serves as a protective layer on the backsheet. It may be comprised of one or more of the following (mixed with the particles): PET, PEN, PVF, ETFE, PVDF, PCTFE, FEP, THV, fluoroelastomer, fluoropolymer, polyamide, polyimide, polyester, or combinations thereof. Preferably, the layer is of a dark or black color as these colors have a greater emissivity than highly reflective or mirrored surfaces. As a nonlimiting example, black surfaces may have an emissivity in the range of about 0.80 to about 0.85. A highly reflective mirrored surface may have an emissivity in the range of about 0.02 to 0.03 and this is less desirable.

Figure 14A:
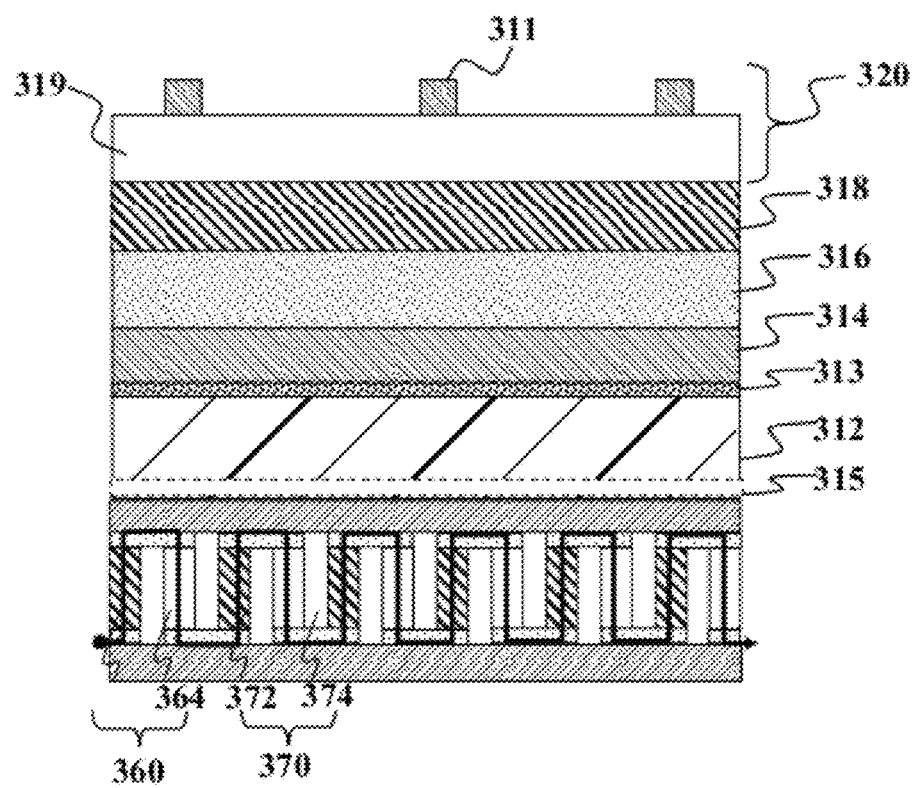
FIGS. 14A and 14B show side cross-sectional views of solar cells according to various embodiments of the present invention.
Figure 14B:
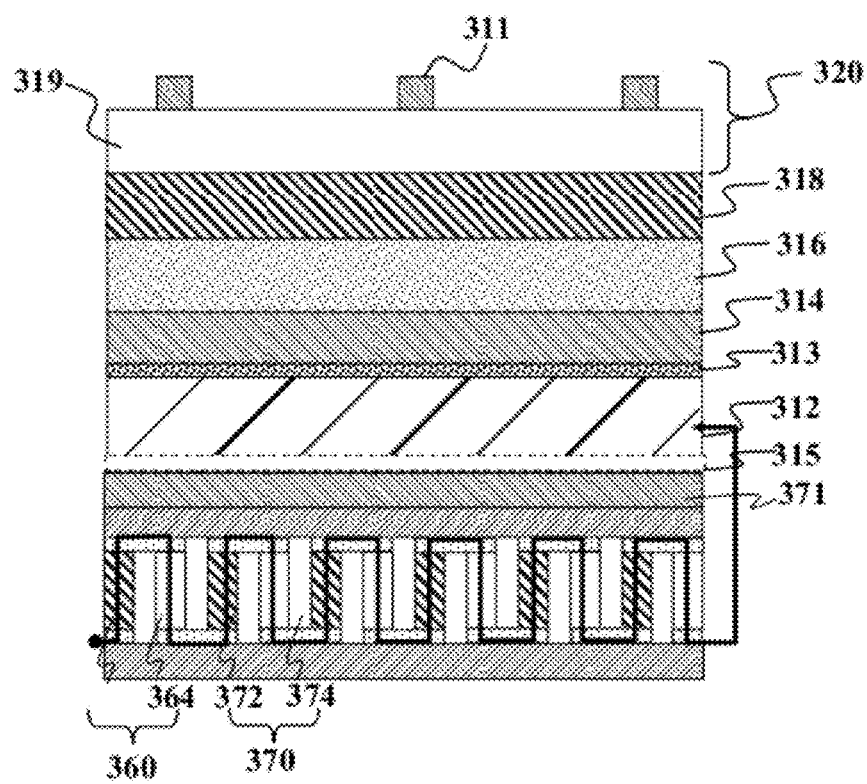

FIGS. 13A and 13B show that the thermoelectric elements are "outside" a bottom foil or back layer of the module. FIGS. 14A and 14B show embodiments where the thermoelectric elements are coupled directly to the solar cell or integrated directly with the solar cell. FIG. 14A also shows that the current flow from the thermoelectric device is as indicated by the arrow. This is shown to be separate from the current generated by the photovoltaic portion of the device.

FIG. 14B shows that there may be an electrically insulating but thermally conductive layer 371. The configuration in FIG. 14B shows that current from the thermo electric device will feed into the substrate 312 of the solar cell.

Although FIGS. 14A and 14B are shown with solar cells with as-shown, it should be understood that the configurations with the thermo electric device may also be configured use with other solar cell architectures (such as those of FIGS. 13A and 13B) or those with other materials such as silicon, organic, dye-sensitized, or other absorber material solar cells.

While the invention has been described and illustrated with reference to certain particular embodiments thereof, those skilled in the art will appreciate that various adaptations, changes, modifications, substitutions, deletions, or additions of procedures and protocols may be made without departing from the spirit and scope of the invention. For example, with any of the above embodiments, the panel can be used with flat solar cells or those that are cylindrical or other shaped. Although glass foil modules are described herein, it should be understood that other module construction techniques are not excluded.

Furthermore, those of skill in the art will recognize that any of the embodiments of the present invention can be applied to almost any type of solar cell material and/or architecture. For example, the absorber layer in solar cell 10 may be an absorber layer comprised of silicon, amorphous silicon, organic oligomers or polymers (for organic solar cells), bi-layers or interpenetrating layers or inorganic and organic materials (for hybrid organic/inorganic solar cells), dye-sensitized titania nanoparticles in a liquid or gel-based electrolyte (for Graetzel cells in which an optically transparent film comprised of titanium dioxide particles a few nanometers in size is coated with a monolayer of charge transfer dye to sensitize the film for light harvesting), Cu—In—Ga—S, Cu—In—Ga—Se, other absorber materials, II-VI materials, IB-VI materials, CuZnTe, CuTe, ZnTe, other alloys II-VI material, $(Au, Ag, Cu)(m, Ga)(S, Se)_2$, $(Au, Ag, Cu)(m, Ga, Al)(S, Se, Te)_2$, IB-IIB-IVA-VIA absorbers, and/or combinations of the above, where the active materials are present in any of several forms including but not limited to bulk materials, micro-particles, nano-particles, or quantum dots. The CIGS cells may be formed by vacuum or non-vacuum processes. The processes may be one stage, two stage, or multi-stage CIGS processing techniques. Additionally, other possible absorber layers may be based on amorphous silicon (doped or undoped), a nanostructured layer having an inorganic porous semiconductor template with pores filled by an organic semiconductor material (see e.g., US Patent Application Publication US 2005-0121068 A1, which is incorporated herein by reference), a polymer/blend cell architecture, organic dyes, and/or $C_{60}$ molecules, and/or other small molecules, micro-crystalline silicon cell architecture, randomly placed nanorods and/or tetrapods of inorganic materials dispersed in an organic matrix, quantum dot-based cells, or combinations of the above. Many of these types of cells can be fabricated on flexible substrates.

A novel photovoltaic-thermoelectric (PV-TE) hybrid device composed of a series-connected solar cell, a solar selective absorber (SSA) and a TE generator is created. The conversion efficiency of the photovoltaic cell was enhanced significantly by using the SSA and TE generator to utilize residual sunlight transmitted through the photovoltaic cell. The hybrid device comprising a photovoltaic cell as a "top cell" for high-energy photons and an SSA coated TE generator as a "bottom cell" for low-energy photons gave rise to an overall conversion efficiency increase. It should also be understood that the foil layers such as 70 and 371 can be made thicker increase mass and act as a heat sink. Mounting a solar cell or solar module with a heat sink has been shown to increase heat transfer out the back or underside of the solar module. This in turn increase the temperature differential between a hot side and cold side of the thermoelectric device, thus increasing power output. In one embodiment, the cold side is coupled to transfer heat to a fluid being provided into a solar fluid heating system or a solar thermal to electrical conversion plant, which further cools the cold side and provides heat to the fluid which can be used to heat other items or as hot fluid such as hot water.

Additionally, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a size range of about 1 nm to about 200 nm should be interpreted to include not only the explicitly recited limits of about 1 nm and about 200 nm, but also to include individual sizes such as 2 nm, 3 nm, 4 nm, and sub-ranges such as 10 nm to 50 nm, 20 nm to 100 nm, etc. . . . .

The publications discussed or cited herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed. All publications mentioned herein are incorporated herein by reference to disclose and describe the structures and/or methods in connection with which the publications are cited. For example, Ujihara, M. and G. P. Carman. 2007 "Thermal energy harvesting using ferromagnetic devices" Applied Physics Letters 91, 093508; Helman et al. "Low-coercivity amorphous magnetic alloy films" J. Appl. Phys. 49, 5663 (1978) vol 49, issue 11; Thevenard et al. "Tuning the Ferromagnetic Properties of Hydrogenated GaMnAs, Applied Physics Letters 87 (2005) 182506; Lotters et al. "Polydimethylsiloxane, a photocurable rubbereleastic polymer used as spring material in micromechanical sensors" Microsystem Technologies (1997) 64-67; Koch, et al. Magnetization Reversal in Micron-Sized Magnetic Thin Films" PHYSICAL REVIEW LETTERS Vol. 81, No. 20, 4512-4515; Hatami et al. "Thermoelectric effects in magnetic nanostructures" PHYSICAL REVIEW B 79, 174426 2009; Bauer et al. "Nanoscale Magnetic Heat Pumps and Engines" PACS numbers: 75.78.Fg, 85.85.+j, 62.25.−g, 72.15.Jf; Dubi and Di Ventura "Energy flow, thermoelectricity and Fourier's law in atomic and molecular Junctions". Each of the above is fully incorporated herein by reference for all purposes.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A photovoltaic and thermoelectric power generating device comprising:
   a structure including:
      at least one photovoltaic cell;
      a thermally conductive backsheet below the cell;
      at least one thermoelectric converter thermally coupled to said structure, wherein the at least one thermoelectric converter comprises a hard ferromagnet and a soft ferromagnetic material and a layer of thermally conductive elastic polymer material sandwiched between the hard ferromagnet and the soft ferromagnetic material.

2. The device of claim 1 wherein said solar-electrical generator exhibits a solar energy conversion of at least 4%.

3. The device of claim 1 wherein a temperature difference between the high-temperature and a low-temperature ends of said thermoelectric converter is at least about 50 C.

4. The device of claim 1 wherein the thermally conductive substrate comprises of a metal foil.

5. The device of claim 1 wherein the at least one thermoelectric converter and the photovoltaic cell are thermally and physically integrated.

6. The device of claim 1 wherein the at least one thermoelectric converter and the photovoltaic cell are thermally integrated but physically separated by the back sheet.

7. The device of claim 1 wherein the at least one thermoelectric converter is electrically coupled to feed current to the photovoltaic cell and are electrically integrated.

8. The device of claim 1 wherein the at least one thermoelectric converter is electrically coupled to feed current to separate sources and are not electrically integrated.

9. The device of claim 1 wherein the at least one thermoelectric converter is located at harmonically optimum locations to increase vibration.

10. The device of claim 1 wherein the device is flat, planar panel.

11. The device of claim 1 wherein heat from the structure is received by a hot side of the thermoelectric converter; generating electricity from the thermoelectric converters; and providing heat from a cold side of the set of thermoelectric converters to a fluid being provided into a solar fluid heating system or a solar thermal to electrical conversion plant.

12. The module of claim 1 wherein the photovoltaic cell has an absorber layer that includes one or more inorganic materials from the group consisting of: titania ($TiO_2$), nanocrystalline $TiO_2$, zinc oxide (ZnO), copper oxide (CuO or $Cu_2O$ or $Cu_xO_y$), zirconium oxide, lanthanum oxide, niobium oxide, tin oxide, indium oxide, indium tin oxide (ITO), vanadium oxide, molybdenum oxide, tungsten oxide, strontium oxide, calcium/titanium oxide and other oxides, sodium titanate, potassium niobate, cadmium selenide (CdSe), cadmium sulfide (CdS), copper sulfide ($Cu_2S$), cadmium telluride (CdTe), cadmium-tellurium selenide (CdTeSe), copper-indium selenide ($CuInSe_2$), cadmium oxide ($CdO_x$), CuI, CuSCN, a semiconductive material, or combinations of the above.

13. The device of claim 1 wherein the thermally conductive backsheet comprises of at least one material selected from the group consisting of: stainless steel, copper, aluminum, molybdenum, or combinations thereof.

14. The device of claim 1 wherein the thermally conductive backsheet comprises of a metallized plastic or polymer.

15. The device of claim 1, wherein the thermally conductive elastic polymer material is characterized by a spring constant in a range from about 10 mN/mm to about 500 mN/mm.

16. The device of claim 1, wherein the thermally conductive elastic polymer material is characterized by a spring constant in a range from about 100 mN/mm to about 300 mN/mm.

17. The device of claim 1, wherein the thermally conductive elastic polymer material is characterized by a spring constant of about 200 mN/mm.

18. A structure, comprising:
- a thermally conductive backsheet; and
- at least one thermoelectric converter thermally coupled to said thermally conductive backsheet, wherein the at least one thermoelectric converter comprises a hard ferromagnet and a soft ferromagnetic material and a layer of thermally conductive elastic polymer material sandwiched between the hard ferromagnet and the soft ferromagnetic material.

* * * * *